US007916636B2

(12) United States Patent
Prashker et al.

(10) Patent No.: US 7,916,636 B2
(45) Date of Patent: Mar. 29, 2011

(54) RING NETWORK AGGREGATE RATES

(75) Inventors: Eyal Prashker, Beit Arie D.n. Modi'in (IL); Rafi Ram, Herzliya (IL); Ronen Solomon, Ramat Gan (IL)

(73) Assignee: Corrigent Systems Ltd., Tel Aviv (IL)

( * ) Notice: Subject to any disclaimer, the term of this patent is extended or adjusted under 35 U.S.C. 154(b) by 70 days.

(21) Appl. No.: 12/348,361

(22) Filed: Jan. 5, 2009

(65) Prior Publication Data

US 2010/0172242 A1 Jul. 8, 2010

(51) Int. Cl.
*H04L 12/26* (2006.01)
*H04L 12/56* (2006.01)
*G06F 15/16* (2006.01)

(52) U.S. Cl. ............ 370/230.1; 370/235; 370/404; 370/406; 709/251

(58) Field of Classification Search .......... 370/222–224, 370/229–236.2, 401–406; 709/220–226, 709/230–244, 249, 251
See application file for complete search history.

(56) References Cited

U.S. PATENT DOCUMENTS

| 6,240,066 | B1 * | 5/2001 | Nagarajan et al. | 370/230 |
| 7,068,607 | B2 * | 6/2006 | Partain et al. | 370/241 |
| 7,190,698 | B2 * | 3/2007 | Svanberg et al. | 370/395.2 |
| 7,330,431 | B2 * | 2/2008 | Bruckman | 370/232 |
| 7,336,605 | B2 * | 2/2008 | Bruckman et al. | 370/230 |
| 7,418,000 | B2 * | 8/2008 | Bruckman et al. | 370/412 |
| 2004/0228278 | A1 * | 11/2004 | Bruckman et al. | 370/231 |
| 2005/0083842 | A1 * | 4/2005 | Yang et al. | 370/230 |

* cited by examiner

*Primary Examiner* — Tri H Phan
(74) *Attorney, Agent, or Firm* — Peter A. Nieves; Sheehan Phinney Bass + Green PA

(57) ABSTRACT

A functionality and method for determining aggregate data transit bandwidth requirements for the nodes of an Ethernet ring network for traffic management and to improve the operation, efficiency, and Quality of Service. An aggregate bandwidth database is produced, based on a priori knowledge of the ring network, including topology, path utilization, bandwidth sharing, and failure protection scenarios. Aggregate bandwidth requirements are determined independent of the actual real-time data traffic rates, and without requiring any actual real-time data traffic rate information. Aggregate bandwidth is automatically determined upon configuration or reconfiguration of the ring network.

19 Claims, 6 Drawing Sheets

RING NETWORK AGGREGATE RATES

FIELD OF THE INVENTION

The present invention relates to packet ring networks and, more particularly, to bandwidth allocation and traffic management thereof.

BACKGROUND OF THE INVENTION

Managing the data traffic in a ring network, such as an Ethernet Ring, involves two general procedures: determining the applicable bandwidth parameters at each point in the ring; and moderating the actual (real-time) data traffic at each point according to the applicable bandwidth parameters.

Bandwidth parameters take into account factors including, but not limited to: Quality of Service (QoS); Class of Service (CoS); Class Type (CT); ringlet (also denoted as "ring side", being one of: "inner" and "outer"); and failure protection scenario. Moreover, rates are categorized in terms of Committed Information Rate (CIR) and Excess Information Rate (EIR), as well as combinations thereof in cases of shared resources.

Moderating the real-time traffic is typically done via hardware modules which detect real-time traffic rates, and which buffer and schedule transmission of data packets according to various prior-art strategies and algorithms. A typical goal of traffic management is to minimize network latency, especially for high-priority classes of service, by versatile utilization of bandwidth resources. At the same time, however, it is also desired to avoid traffic congestion, because this can cause failures in sustaining QoS for certain classes. It is therefore highly desirable to know the details of the available bandwidth distribution in order to moderate real-time traffic efficiently while minimizing the probability of congestion.

The available bandwidth distribution (as a function of the factors listed above) typically varies, however, especially in cases of node and/or segment failure. Failure of a single node and/or segment typically has an effect on the available bandwidth throughout the ring, and the effect is typically different from one node to another.

Unfortunately, however, when configuring or reconfiguring a network ring, the network elements currently have limited information about the available bandwidth parameters, and therefore cannot configure traffic management in the best way possible.

There is thus a need for, and it would be highly advantageous to have, an improved way of dependably determining the available bandwidth parameters of a ring network and thereby providing efficient traffic management functionality to the network elements thereof. This goal is met by the present invention.

SUMMARY OF THE INVENTION

The present invention provides a functionality and method for determining aggregate bandwidth requirements for an Ethernet ring network, based on a priori knowledge of the ring network, including the topology, path utilization, bandwidth sharing, and the failure protection scenarios of the ring network. It is therefore assumed that the topology and failure scenarios are known a priori, and that a priori primary bandwidth allocation data is available from a resource or agent such as a bandwidth broker.

According to embodiments of the present invention, aggregate bandwidth requirements are furnished in an aggregate bandwidth database; only transit bandwidth requirements through each node are determined—add traffic and download traffic are not taken into account; the aggregate bandwidth requirements are separately determined for each node of the ring network; aggregate bandwidth is automatically determined upon configuration or reconfiguration of the ring network; and aggregate bandwidth requirements are determined in a manner that is independent of the actual real-time data traffic rates—i.e., actual real-time data traffic rates do not affect the aggregate bandwidth. The present invention therefore does not require any actual real-time data traffic rate information.

The resulting aggregate bandwidth requirements are available for traffic management and configuring the ring network, to improve the operation, efficiency, and Quality of Service.

Therefore, according to the present invention there is provided a traffic management functionality for an Ethernet ring network having a plurality of nodes and segments, the traffic management functionality including: (a) a priori knowledge based bandwidth responsive functionality for automatically configuring a set of traffic management parameters at at least one of the plurality of nodes; and (b) a priori knowledge based bandwidth change responsive functionality for automatically reconfiguring the set of traffic management parameters at at least one of the plurality of nodes; (c) the bandwidth responsive functionality and,the bandwidth change responsive functionality being: (d) based on a priori knowledge of available bandwidths of the plurality of nodes and segments; and (e) independent of traffic rates within the Ethernet ring.

In addition, according to the present invention there is also provided a method for providing to a traffic management module an aggregate bandwidth database for an Ethernet ring having a plurality of nodes, the method including: (a) obtaining a bandwidth allocation database containing an allocated pass-through bandwidth corresponding to each node of the plurality of nodes; (b) providing an aggregate bandwidth database containing at least one field, the field having at least one value initialized to zero and associated with a predetermined set of keys having at least one key selected from: a Class of Service; a Class Type; a ring side; and a protection scenario; (c) for a given node of the plurality of nodes, aggregating to the at least one value the allocated pass-through bandwidth corresponding to the given node according to a predetermined rule; and (d) furnishing the aggregate bandwidth database to the traffic management module.

The present invention will be more fully understood from the following detailed description of the embodiments thereof, taken together with the drawings in which:

DETAILED DESCRIPTION OF EMBODIMENTS

The principles and operation of traffic management functionality and method according to the present invention may be understood with reference to the drawings and the accompanying description.

Figure 1:
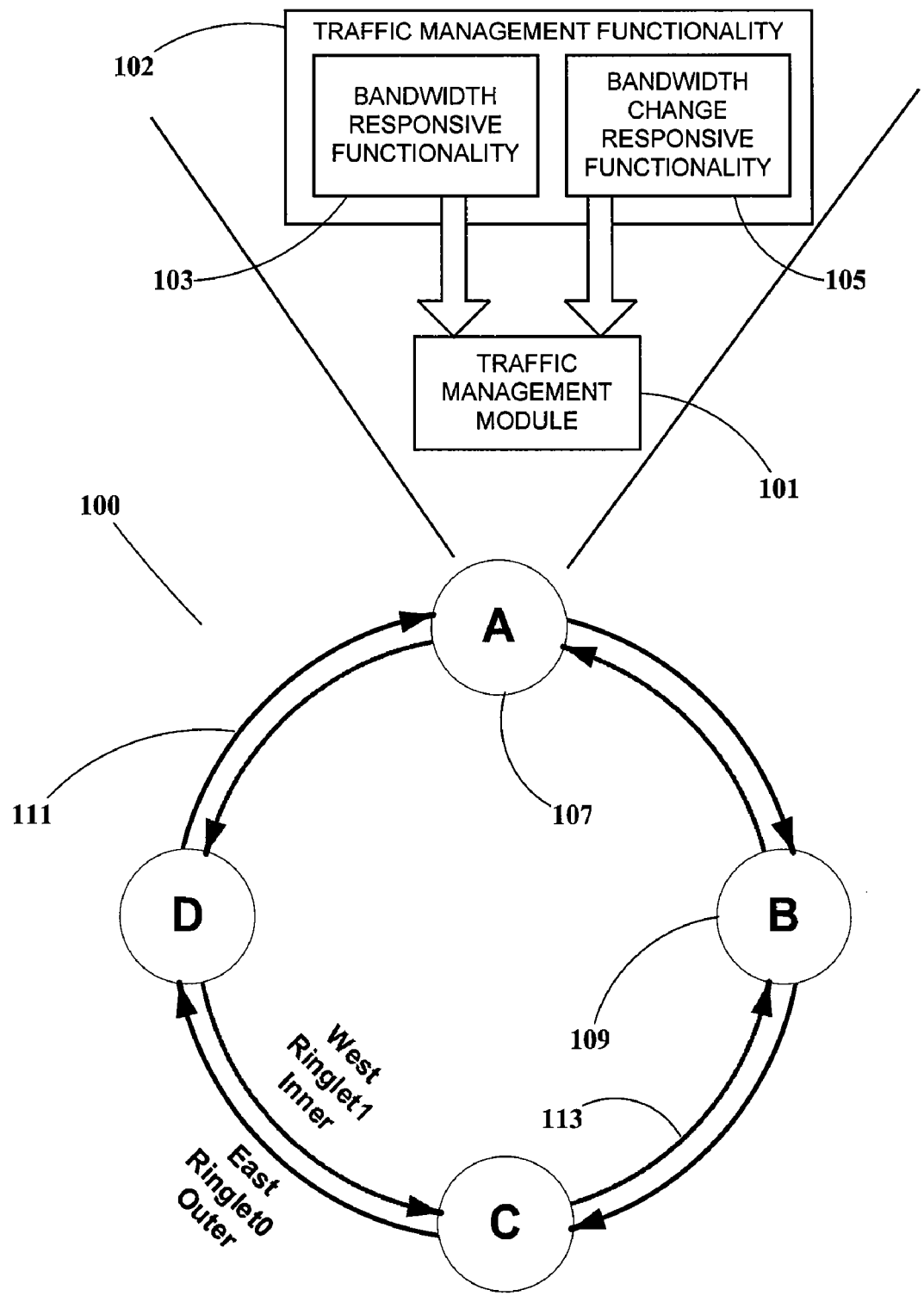
FIG. 1 is a simplified illustration conceptually showing a ring network, showing a traffic management module and bandwidth responsive functionalities according to an embodiment of the present invention.

FIG. 1 illustrates a ring network 100, showing a traffic management module 101. In addition, according to an embodiment of the present invention there is shown a traffic management functionality 102 which includes a bandwidth responsive functionality 103 and a bandwidth change responsive functionality 105. In an embodiment of the present invention, traffic management functionality 102 is associated with traffic management module 101. In a further embodiment of the present invention, traffic management module 101 is associated with ring network 100.

Ring 100 has multiple nodes, including a node A 107, which is the node containing traffic management module 101 and traffic management functionality 102. Other nodes contain similar modules and functionalities (not shown). A typical other node is a node B 109. Also shown are multiple transmission media segments ("segments"), such as a segment 111 denoted as DA; and a segment 113 denoted as CB. Data packets input through a node into the ring constitute what is commonly called "add" traffic, and this is generally known any given node. Data packets which pass through a node from one segment of the ring to another, however, constitute what is commonly called "transit" traffic, and this is generally unknown.

In certain embodiments of the present invention, the ring network is an Ethernet ring.

A Priori Knowledge Based Functionality

According to embodiments of the present invention, functionalities are based on pre-existing information related to bandwidth capacities in a ring network. Certain embodiments of the present invention rely for this on a predetermined bandwidth allocation database, as is typically provided by a Bandwidth Broker (BWB).

In particular, certain embodiments of the present invention make no use of actual real-time traffic rates within the ring network, and the functionalities thereof are for automatically configuring traffic management parameters for the ring network in a manner that is independent of the traffic rates in the ring.

Bandwidth Responsive Functionality

In embodiments of the present invention, traffic management parameters of the ring network are data transmission bandwidths. A non-limiting example of traffic management configuration is the setting of the parameters for a Weighted Fair Quality (WFQ) shaper.

Figure 2A:
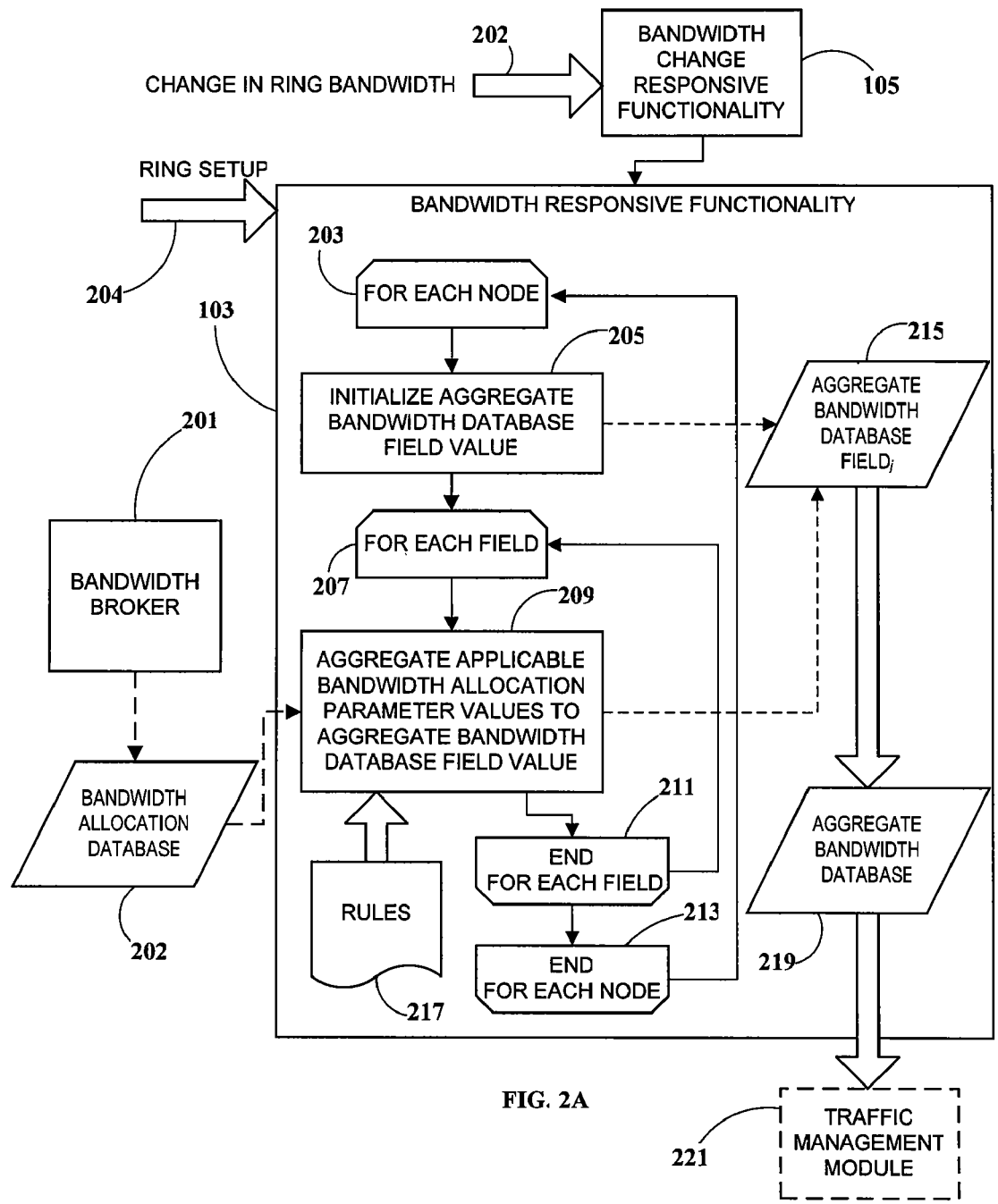
FIG. 2A is a simplified illustration conceptually showing a bandwidth responsive functionality according to an embodiment of the present invention.

FIG. 2A conceptually illustrates the detailed operation of bandwidth responsive functionality 103 and bandwidth change responsive functionality 105 according to an embodiment of the present invention. According to certain embodiments of the present invention, the detailed operation of bandwidth change responsive functionality 105 is the same as that of bandwidth responsive functionality 103, but responds specifically to changes in ring bandwidth capacity 202. Bandwidth responsive functionality 103 responds to conditions including, but not limited to ring setup (or initialization) 204.

Figure 3:
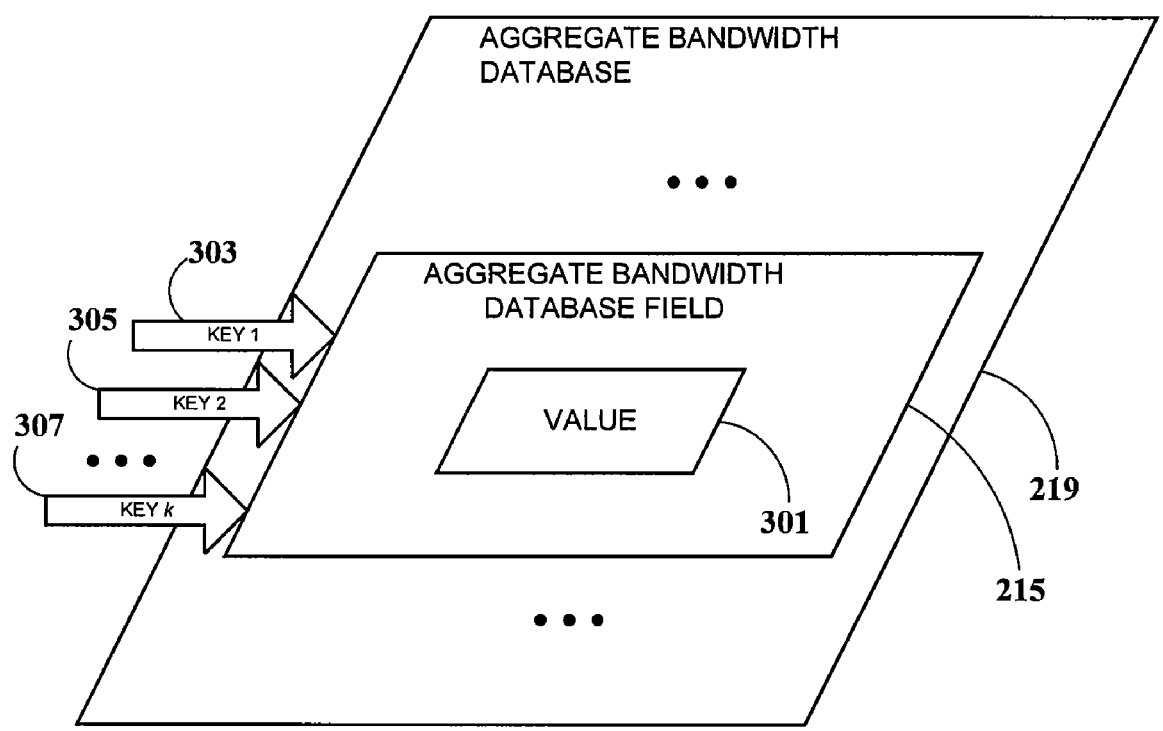
FIG. 3 is a simplified illustration conceptually showing the components of an aggregate bandwidth database according to embodiments of the present invention.

The details of response operation according to an embodiment of the present invention are as follows:

A loop entry point 203 with a loop exit point 213 defines a procedure which iterates on the ring nodes. For each node, a step 205 initializes the value of an aggregate bandwidth database field 215 to zero. The details of an aggregate bandwidth database 219 and the structure thereof are illustrated in FIG. 3 and are discussed below. In this discussion, a ring has N nodes: 1, 2, . . . , N, and the node which is currently being iterated at loop entry point 203 is denoted as $node_i$, where $1 \leq i \leq N$.

Next, a loop entry point 207 with a loop exit point 211 defines a procedure which iterates on the fields of bandwidth allocation database 202 which are applicable to $node_i$. Details of the database fields are also discussed in detail below. It is understood that aggregate bandwidth database field 215 is shown as being representative of a general aggregate bandwidth database 219 field denoted as $field_j$ for the purpose of illustrating the procedure, and does not represent any given field in particular. Specifically, as loop entry point 207 iterates over all values of j for bandwidth allocation database 202, all applicable fields of aggregate bandwidth database 219 will be updated as provided by predetermined rules 217.

According to certain embodiments of the present invention, it is assumed that bandwidth responsive functionality 103 has access to: the ring reference topology; and a ring-wide database of bandwidth allocations.

As is common practice in the field, a ring-wide database of bandwidth allocations 202 is constructed and distributed by a Bandwidth Broker (BWB) 201.

In a step 209, the bandwidth parameter values in bandwidth allocation database 202 which are associated with the various fields whose bandwidths are applicable to $node_i$ are aggregated to the value of $field_j$ 215 in accordance with the rules of a predetermined rule set 217.

Predetermined rule set 217 determines conditions including, but not limited to: whether a parameter value in bandwidth allocation database 202 is aggregated to the value of $field_j$ 215 (or not aggregated); and, if so, specifically how a parameter value in bandwidth allocation database 202 is aggregated to the value of field$_j$ 215.

The term "predetermined rule" herein denotes a rule based on factors including, but not limited to: network topology; failure scenario; and bandwidth sharing.

Although a rule's structure is predetermined, it is understood that the factors above (network topology, failure scenario, etc.) may change and are therefore determined at the time the rule is applied. This is illustrated in the LSP example presented below.

Aggregation

The terms "aggregate", "aggregated", and related forms herein denote the inclusion of a parameter value into a collective overall amount. Depending on the predetermined rule in effect, aggregation is performed in ways including, but not limited to: addition; and selecting the greater (or maximum) of two or more values.

The LSP example given below shows the application of some predetermined rules.

Bandwidth Sharing

Figure 2B:
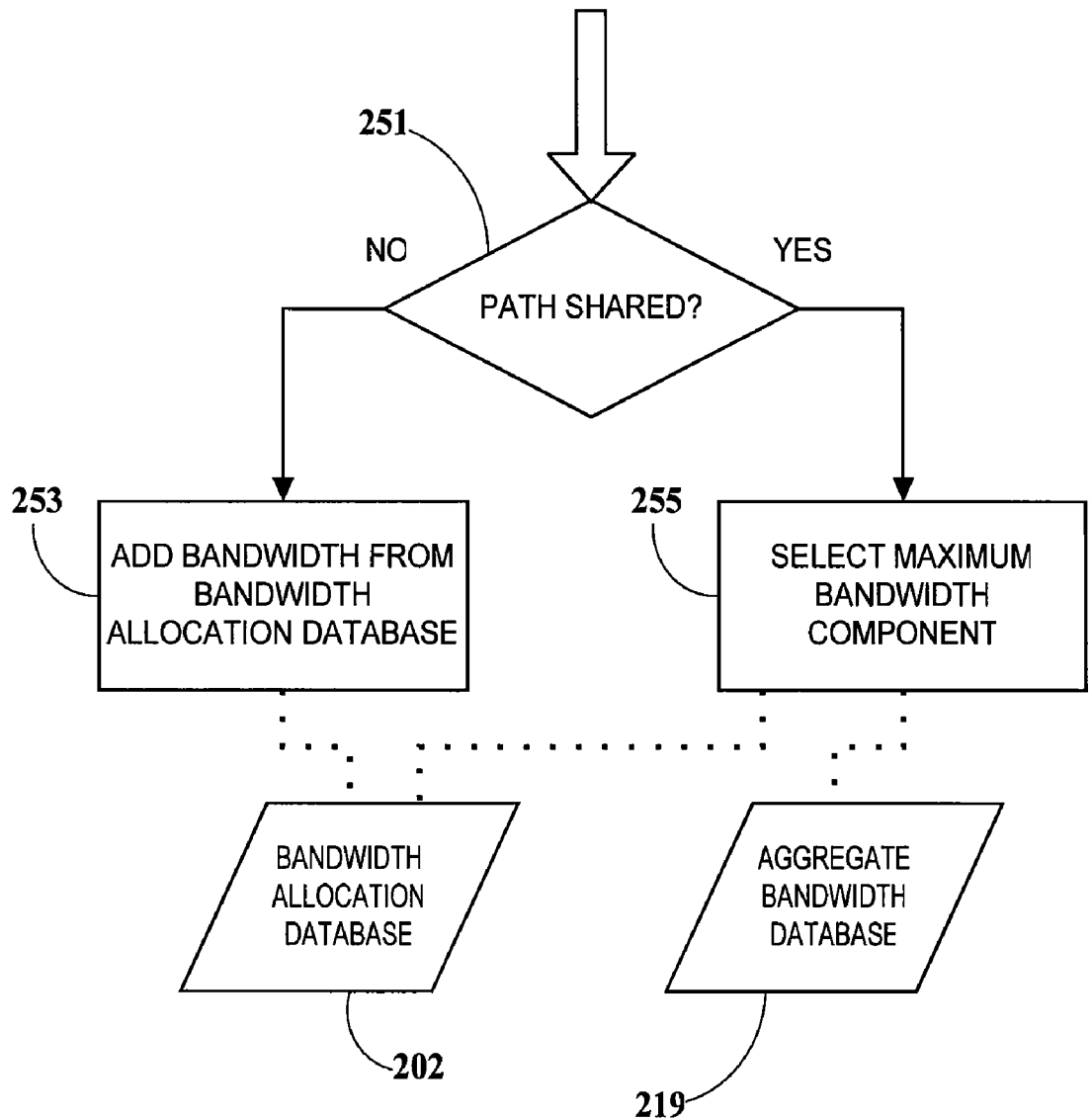
FIG. 2B is a flowchart illustrating the aggregation procedure according to embodiments of the present invention.

Elements of a ring can be shared among different paths, and, according to embodiments of the present invention, this case is taken into account by the predetermined rules for aggregating bandwidth capacity. As illustrated in FIG. 2B, at a decision point 251, it is determined whether the bandwidth allocations are shared. If the allocations are not shared, in a step 253 the absolute values of the bandwidths are added. If the allocations are shared, in a step 255 the maximum bandwidth is selected. (This is illustrated in the LSP example below, for paths LSP1 and LSP3.)

After iteration loop 203 has iterated all applicable nodes, aggregate bandwidth database 219 contains the aggregate bandwidth data for the ring. In embodiments of the present invention, an application can then use this data for ring management or analysis. A non-limiting example of an application is a traffic management module 221, which provides traffic management functionality for an Ethernet ring network.

In an embodiment of the present invention, the application is external to the bandwidth responsive functionality. In another embodiment of the present invention, the application and the bandwidth responsive functionality are contained in a common hardware, software, or hardware/software module. In yet another embodiment of the present invention, the bandwidth responsive functionality contains the application. In a further embodiment of the present invention, the application contains the bandwidth responsive functionality. In a still further embodiment of the present invention, the functionality is contained within a ring network, within a node thereof, or within a network entity or network element (NE) thereof.

Aggregate Bandwidth Database

An aggregate bandwidth database (such as aggregate bandwidth database 219 in FIG. 2A) is produced by a bandwidth responsive functionality according to embodiments of the present invention. FIG. 3 conceptually illustrates the basic structure of aggregate bandwidth database 219.

The term "database" herein denotes any data structure, or part thereof, which is arranged according to a schema for storing and retrieving at least one data value organized by at least one key and contained in machine-readable data storage of any kind, including, but not limited to: computer memory, RAM, ROM, and the like; magnetic and optical storage, and the like; flash memory storage; computer and network data storage devices; or in similar devices, apparatus, or media.

In particular, the term "database" is herein expansively construed to include data organized in tabular format, where data values appear in cells arranged in one or more rows and/or one or more columns serving as keys. Representations of databases in table format herein are understood to correspond to data stored in machine-readable devices and media.

As shown in FIG. 3, field 215 has a value 301 and is selected from other fields in the database by one or more keys, shown in a non-limiting case of a key$_1$ 303, a key$_2$ 305, and a key$_k$ 307.

Keys for an aggregate bandwidth database according to embodiments of the present invention include, but are not limited to: a Class of Service (such as: High Priority; Expedited Forwarding; Assured Forwarding; Best Effort; and Expedited Forwarding multicast), a Class Type (such as: Real Time; T1 Committed Information Rate (CIR); T1 Excess Information Rate (EIR); T2 Committed Information Rate; and T2 Excess Information Rate); a ring side (Outer side, also referred to as "East ringlet"; and Inner side, also referred to as "West ringlet"); and a protection scenario (such as a normal scenario, where all ring nodes and segments are functioning properly; and a failure scenario, where a particular node and/or segment has failed).

In a non-limiting example of the present invention, an aggregate bandwidth database is represented as follows, for a ring having four nodes ("A", "B", "C", and "D") and four segments ("AB", "BC", "CD", and "DA"):

TABLE 1

Example of an Aggregate Bandwidth Database

| | High Priority | Expedited Forwarding | Expedited Forwarding | | | Assured Forwarding | | | | | Best Effort | | |
|---|---|---|---|---|---|---|---|---|---|---|---|---|---|
| | Real Time | Multicast Real Time | Real Time | T1-CIR | T2-CIR | Real Time | T1-CIR | T1-EIR | T2-CIR | T2-EIR | Real Time | T1-EIR | T2-EIR |
| Normal | | | | | | | | | | | | | |
| Fail AB | | | | | | | | | | | | | |
| Fail BC | | | | | | | | | | | | | |

TABLE 1-continued

Example of an Aggregate Bandwidth Database

| | High Priority | Expedited Forwarding | Expedited Forwarding | | Assured Forwarding | | | | | Best Effort | | |
|---|---|---|---|---|---|---|---|---|---|---|---|---|
| | Real Time | Multicast Real Time | Real Time | T1-CIR | T2-CIR | Real Time | T1-CIR | T1-EIR | T2-CIR | T2-EIR | Real Time | T1-EIR | T2-EIR |
| Fail CD | | | | | | | | | | | | | |
| Fail DA | | | | | | | | | | | | | |

The rows and columns of Table 1 are the keys, and the cells are the fields holding the values. The database example shown in Table 1 is initialized and is currently empty (as initialized in step 205 of FIG. 2A). An empty cell (or field) is considered to represent a data value of zero, i.e., no bandwidth, no data-carrying capacity.

It is emphasized that an aggregate bandwidth database can have additional keys and key values. For example, there are additional classes of Assured Forwarding service than are shown in the non-limiting example of Table 1.

Bandwidth Allocation Database

A bandwidth allocation database (such as bandwidth allocation database 202 in FIG. 2A) contains a priori knowledge for a bandwidth responsive functionality according to embodiments of the present invention.

In a non-limiting example, a bandwidth allocation database is represented as follows:

TABLE 2

Example of a Bandwidth Allocation Database

| Tunnel ID | Tunnel Src | Tunnel Dest | Configured Ringlet | Prot Method | RT Rate | T1 CIR | T1 EIR | T1 CIR Prot | T1 EIR Prot |
|---|---|---|---|---|---|---|---|---|---|
| 1 | D | B | Outer | none | 20 | 40 | 50 | 30 | 40 |
| 2 | D | B | Inner | SteerR | 30 | 100 | 200 | 50 | 200 |
| 1 | D | B | Inner | SteerR | 50 | 60 | 70 | 10 | 80 |
| 3 | C | B | Inner | SteerR | 100 | 200 | 60 | 90 | 10 |

In this non-limiting example, the database keys include the ID, Source ("Src") Destination ("Dest"), ringlet, and protection method ("none" for unprotected; "SteerR" for steer-revertive) of a particular path ("Tunnel"). Other keys are also possible. The data values of the fields are in kbps, representing the bandwidth allocations.

As is well-known, a bandwidth allocation database of this sort is provided by a Bandwidth Broker (such as Bandwidth Broker 201 in FIG. 2A), and constitutes a priori information about a ring network which is independent of the actual real-time traffic rates of the network.

Protection Scenarios

Ring networks in general offer a number of different failure recovery mechanism broadly classified as either wrapping or steering. Certain embodiments of the present invention recognize two protection scenarios: non-protected, and steer-revertive protected. In the non-protected case, if a failure occurs on the path designated for the service, then the service itself unconditionally fails. In the case of steer-revertive protection, the ring is temporarily reconfigured to route the traffic through alternative segments and nodes around the failure.

General Predetermined Rules

According to embodiments of the present invention, general predetermined rules provide for excluding traffic that is not transit traffic:

Traffic that is added at a source node is not aggregated at that node.

Traffic that is dropped at a destination node is not considered in computing aggregate rates.

Predetermined Rules for LSP Aggregation

According to an embodiment of the present invention, predetermined rules for LSP rate aggregation include:

The LSP normal bandwidths are aggregated for a node only when the LSP normally passes through that node (i.e., when there is no failure in the ring).

In the case of an unprotected LSP, the LSP bandwidths for cases of segment failure are not aggregated for a node when the LSP does not pass through that node.

In case of an LSP that is "steer revertive", the LSP bandwidths for cases of segment failure are aggregated as follows:

If the LSP is steered through a node, the relevant LSP protection bandwidths (for CoS and CT) are aggregated for that node.

If the LSP is steered and does not pass through a node, the LSP protection bandwidths are not aggregated for that node.

For a node in the LSP's normal path, for segment failure that is not in the LSP's normal path, only the LSP's normal rate bandwidths (for CoS and CT) are aggregated for that node.

LSP Example

Figure 4:
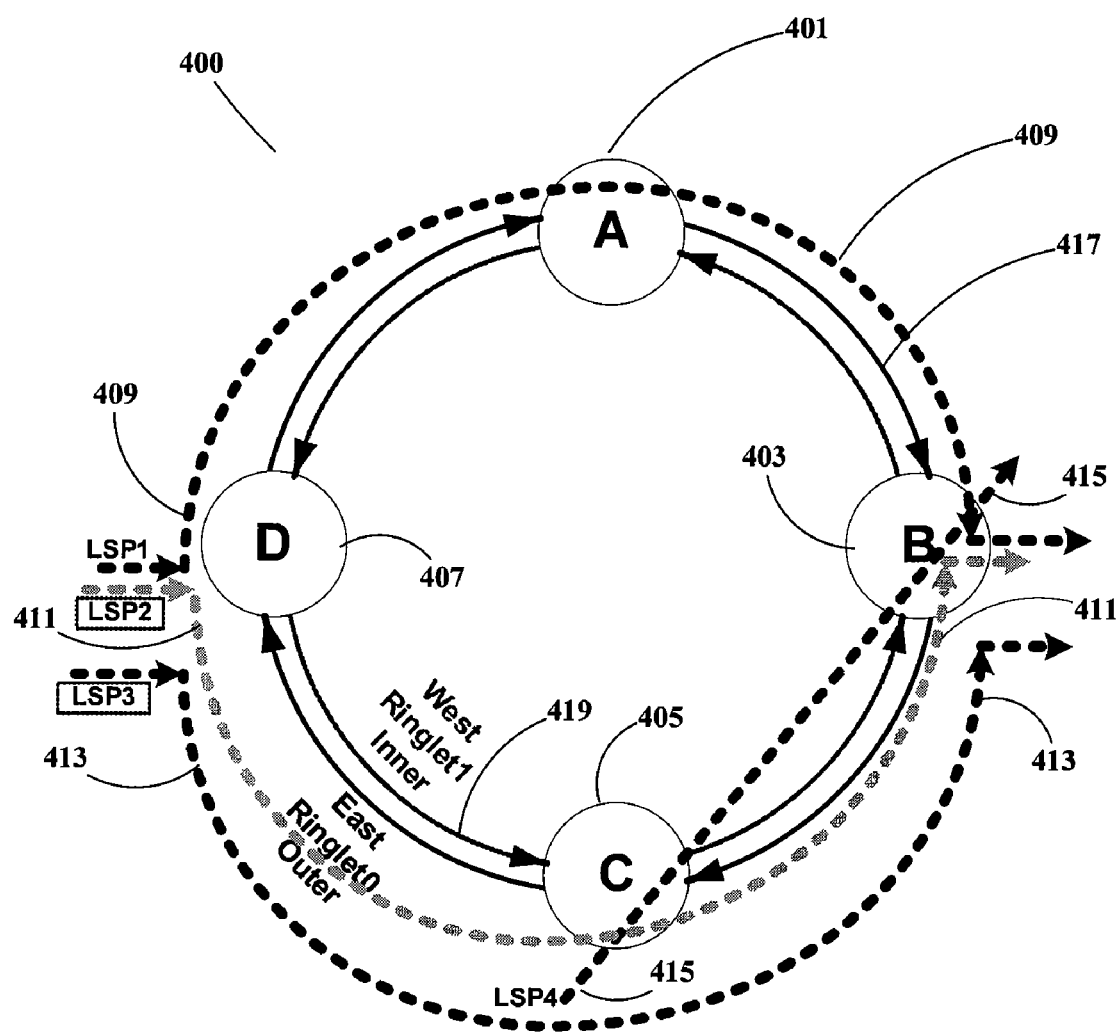
FIG. 4 is a simplified illustration conceptually showing a non-limiting example of bandwidth responsive functionality for a ring with LSP's according to an embodiment of the present invention.

A non-limiting example is illustrated in FIG. 4. A ring network 400 has a node "A" 401, a node "B" 403, a node "C" 405, and a node "D" 407.

A label switched path (LSP), denoted as LSP1 409 has node "D" 407 as a source and node "B" 403 as a destination. LSP's are unidirectional, and LSP1 409 is directed through node "A" 401 via an outer ringlet 417.

(It is noted that an LSP is sometimes referred to as a "tunnel" in Multi-Protocol Label Switching, and the term "tunnel" is also used herein with reference to LSP's. In addition, the term "path" is herein expansively construed to denote any data route over one or more segments of a network. A path having more than one segment also involves one or more nodes connecting the segments.)

Another LSP, denoted as LSP2 411 also has node "D" 407 as a source and node "B" 403 as a destination. LSP2 411, however, is directed through node "C" 405 via an inner ringlet 419.

Still another LSP, denoted as LSP3 413 also has node "D" 407 as a source and node "B" 403 as a destination. Like LSP2 411, LSP3 413 is directed through node "C" 405 via inner ringlet 419. It is furthermore stipulated that LSP3 is shared with LSP1, as described previously for bandwidth sharing.

Yet another LSP, denoted as LSP4 415 has node "C" 405 as a source and node "B" 403 as a destination, and is also via inner ringlet 419.

In this non-limiting example, an aggregate bandwidth database is generated for node "A" 401. (To generate a complete aggregate bandwidth database according to certain embodiments of the present invention, a loop would iterate over all the nodes of the ring, as shown by loop entry point 203 in FIG. 2A.) According to certain embodiments of the present invention, however, a separate RAR application is installed in each individual node, and the aggregate bandwidth database for node "A" 401 is sufficient for the RAR application installed in that node. In these embodiments, node "B" 403 has an aggregate bandwidth database for node "B" 403, separately generated in a similar fashion.

In order to generate the aggregate bandwidth database, the bandwidth allocation database with a priori knowledge of the network is first obtained, such as through a Bandwidth Broker or similar agent. For this non-limiting example, the bandwidth allocation database is shown in Table 3. In addition, the Class of Service for all LSP's in this non-limiting example is given as Assured Forwarding at T1 rates.

TABLE 3

Bandwidth Allocation Database for LSP Example

| Tunnel ID | Tunnel Src | Tunnel Dest | Configured Ringlet | Prot Method | RT Rate | T1 CIR | T1 EIR | T1 CIR Prot | T1 EIR Prot |
|---|---|---|---|---|---|---|---|---|---|
| 1 | D | B | Outer | none | 20 | 40 | 50 | 30 | 40 |
| 2 | D | B | Inner | SteerR | 30 | 100 | 200 | 50 | 200 |
| 1 | D | B | Inner | SteerR | 50 | 60 | 70 | 10 | 80 |
| 3 | C | B | Inner | SteerR | 100 | 200 | 60 | 90 | 10 |

As indicated in initialization step 205 of FIG. 2A, we begin by initializing the aggregate bandwidth database for node "A" 401. Note that for this particular node, only outer ringlet 417 is of interest, because none of the LSP's defined for this example make use of inner ringlet 419, even in a failure scenario. This is not the case in general, however.

The initialized aggregate bandwidth database is the same as shown in Table 1 above, and simplified for the Assured Forwarding CoS at T1 rates is:

TABLE 4

Initialized Aggregate Bandwidth Database for LSP Example

| | Assured Forwarding | | |
|---|---|---|---|
| | Real Time | T1-CIR | T1-EIR |
| Normal | | | |
| Fail AB | | | |
| Fail BC | | | |
| Fail CD | | | |
| Fail DA | | | |

Table 4, as well as the other aggregate bandwidth database tables for the LSP example applies only to the outer ringlet of the ring shown in FIG. 4. The inner ringlet is not relevant in this example, so there are no values computed for the inner ringlet.

As noted previously, an empty cell in table format represents a zero value in the corresponding database field. In addition, this is for outer ringlet 417.

Next, to iterate through the various fields of the Bandwidth Allocation Database (as indicated by loop entry point 207 of FIG. 2A.), we start first with LSP1 fields from Table 3 as show in Table 5:

TABLE 5

First iteration group in Bandwidth Allocation
Database for LSP Example

| | Tunnel ID | Tunnel Src | Tunnel Dest | Configured Ringlet | Prot Method | RT Rate | T1 CIR | T1 EIR | T1 CIR Prot | T1 EIR Prot |
|---|---|---|---|---|---|---|---|---|---|---|
| LSP1 | 1 | D | B | Outer | none | <u>20</u> | <u>40</u> | <u>50</u> | 30 | 40 |

The data values shown in Table 5 apply to the "Normal" scenario (i.e., no failures of any part of the ring) of the Aggregate Bandwidth Database as well as the scenarios involving the failure of segment "BC" or segment "CD". If, however, segment "AB" or segment. "DA" fails, the data from Table 5 does not apply.

These data values correspond to an "iteration group", because there are, in this case, three applicable fields, shown with underlined values in Table 5. After iterating on the applicable fields of Table 5, the Aggregate Bandwidth Database is:

TABLE 6

Aggregate Bandwidth Database for LSP Example -
after 1st Iteration Group

| | Assured Forwarding | | |
|---|---|---|---|
| | Real Time | T1-CIR | T1-EIR |
| Normal | <u>20</u> | <u>40</u> | <u>50</u> |
| Fail AB | | | |
| Fail BC | <u>20</u> | <u>40</u> | <u>50</u> |
| Fail CD | <u>20</u> | <u>40</u> | <u>50</u> |
| Fail DA | | | |

In a like manner, the second iteration group uses LSP2 fields:

TABLE 7

Second iteration group in Bandwidth Allocation
Database for LSP Example

| | Tunnel ID | Tunnel Src | Tunnel Dest | Configured Ringlet | Prot Method | RT Rate | T1 CIR | T1 EIR | T1 CIR Prot | T1 EIR Prot |
|---|---|---|---|---|---|---|---|---|---|---|
| LSP1 | 1 | D | B | Outer | none | 20 | 40 | 50 | 30 | 40 |
| LSP2 | 2 | D | B | Inner | SteerR | <u>30</u> | 100 | 200 | <u>50</u> | <u>200</u> |

In Table 7, fields for LSP1 are also featured for convenient reference, although they are not used in this iteration. The applicable field values in this iteration are underlined in Table 7.

Reference to FIG. 4 and Table 7 shows that LSP2 is directed through node "C" via inner ringlet 419, and therefore under normal circumstances (no failure) does not affect node "A". Under failure conditions of segment "BC" or segment "CD", however, traffic of LSP2 will be routed through node "A". Thus, after iterating on the applicable fields of Table 7, the Aggregate Bandwidth Database is:

TABLE 8

Aggregate Bandwidth Database for LSP Example -
after 2nd Iteration Group

| | Assured Forwarding | | |
|---|---|---|---|
| | Real Time | T1-CIR | T1-EIR |
| Normal | 20 | 40 | 50 |
| Fail AB | | | |
| Fail BC | 20 + <u>30</u> = 50 | 40 + <u>50</u> = 90 | 50 + <u>200</u> = 250 |
| Fail CD | 20 + <u>30</u> = 50 | 40 + <u>50</u> = 90 | 50 + <u>200</u> = 250 |
| Fail DA | | | |

The underlined values in Table 8 are those aggregated from Table 7.

Continuing with the third iteration group using LSP3 fields:

TABLE 9

Third iteration group in Bandwidth Allocation Database for LSP Example

| | Tunnel ID | Tunnel Src | Tunnel Dest | Configured Ringlet | Prot Method | RT Rate | T1 CIR | T1 EIR | T1 CIR Prot | T1 EIR Prot |
|---|---|---|---|---|---|---|---|---|---|---|
| LSP1 | 1 | D | B | Outer | none | 20 | 40 | 50 | 30 | 40 |
| LSP2 | 2 | D | B | Inner | SteerR | 30 | 100 | 200 | 50 | 200 |
| LSP3 | 1 | D | B | Inner | SteerR | <u>50</u> | 60 | 70 | <u>10</u> | <u>80</u> |

As before, in Table 9, fields for LSP1 and LSP2 are also featured for convenient reference, although they are not used in this iteration. The applicable field values in this iteration are underlined in Table 9.

In the event of a failure of segment "BC" and/or segment "CD", LSP3 will be reconfigured to utilize segments "DA" and "AB". As previously given, LSP3 is shared with LSP1. Therefore, according to the procedure for aggregation as specified previously, the bandwidths thereof are aggregated by taking the maximum of LSP1 and LSP3 in the failure cases of interest:

TABLE 10

Aggregate Bandwidth Database for LSP Example - after $3^{rd}$ Iteration Group

| | Assured Forwarding | | |
|---|---|---|---|
| | Real Time | T1-CIR | T1-EIR |
| Normal | 20 | 40 | 50 |
| Fail AB | | | |
| Fail BC | (MAX (*20*, <u>50</u>) + 30) = 80 | (MAX (*40*, <u>10</u>) + 50) = 90 | (MAX (*50*, <u>80</u>) + 200 = 280 |
| Fail CD | (MAX (*20*, <u>50</u>) + 30) = 80 | (MAX (*40*, <u>10</u>) + 50) = 90 | (MAX (*50*, <u>80</u>) + 200 = 280 |
| Fail DA | | | |

Here it is seen that the reference information for LSP1 in Table 9 is useful for identifying the arguments of the MAX( ) function. In Table 10, the values from LSP1 are in italics, and the values from LSP3 are underlined. Note that the CIR and EIR values from LSP1 are for the normal case, not the failure-protected case, whereas the CIR and EIR values from LSP3 are for the failure-protected case, because it is LSP3 that is reconfigured in the event of "BC" and/or "CD" failure.

And finishing with the fourth iteration group using LSP4 fields:

TABLE 11

Fourth iteration group in Bandwidth Allocation Database for LSP Example

| | Tunnel ID | Tunnel Src | Tunnel Dest | Configured Ringlet | Prot Method | RT Rate | T1 CIR | T1 EIR | T1 CIR Prot | T1 EIR Prot |
|---|---|---|---|---|---|---|---|---|---|---|
| LSP1 | 1 | D | B | Outer | none | 20 | 40 | 50 | 30 | 40 |
| LSP2 | 2 | D | B | Inner | SteerR | 30 | 100 | 200 | 50 | 200 |
| LSP3 | 1 | D | B | Inner | SteerR | 50 | 60 | 70 | 10 | 80 |
| LSP4 | 3 | C | B | Inner | SteerR | <u>100</u> | 200 | 60 | <u>90</u> | <u>10</u> |

Once again, in Table 11, fields for LSP1, LSP2, and LSP3 are also featured for convenient reference, although they are not used in this iteration. The applicable field values in this iteration are underlined in Table 11.

It is seen in FIG. 4, in the event of a "BC" failure, LSP4 415 will be reconfigured from the inner "CB" ringlet to use the outer ringlet via node "A" 401. A "CD" failure, however, will not affect LSP4 415. The final aggregate bandwidth database is thus:

TABLE 12

Aggregate Bandwidth Database for LSP Example - after 4th Iteration Group

| | Assured Forwarding | | |
|---|---|---|---|
| | Real Time | T1-CIR | T1-EIR |
| Normal | 20 | 40 | 50 |
| Fail AB | | | |
| Fail BC | 80 + 100 = 180 | 90 + 90 = 180 | 280 + 10 = 290 |
| Fail CD | 80 | 90 | 280 |
| Fail DA | | | |

Therefore, the aggregate bandwidth database for node "A" 401 as used for traffic management is:

TABLE 13

Deliverable Node "A" Aggregate Bandwidth Database for LSP Example

| | Assured Forwarding | | |
|---|---|---|---|
| | Real Time | T1-CIR | T1-EIR |
| Normal | 20 | 40 | 50 |
| Fail AB | | | |
| Fail BC | 180 | 180 | 290 |
| Fail CD | 80 | 90 | 280 |
| Fail DA | | | |

Predetermined Rules for VPLS Aggregation

According to an embodiment of the present invention, the aggregation rules for VPLS are simplified by aggregating unicast, multicast, and broadcast traffic in the same manner, by considering only the source of the traffic, but not the destination. This simplification is a conservative approach to bandwidth aggregation, representing the worst-case situation: VPLS traffic is aggregated throughout the entire ring (subject to the predetermined rules, of course), even if the VPLS utilizes only a portion of the ring. In addition to simplifying the calculations, this approach allows for the possibility of adding a node of the ring to support expansion of the Virtual LAN.

According to an embodiment of the present invention, predetermined rules for VPLS rate aggregation include:

Each VPLS bandwidth allocation field shall be added to the corresponding traffic bandwidth for the normal case, except that bandwidth allocation for the source node shall not be added.

For non-protected cases, bandwidth allocations shall not be added in any case of segment failure.

For steer-revertive cases, the corresponding protected traffic bandwidth allocations shall be added, except for the source node.

In this non-limiting example, an aggregate bandwidth database is generated for node "A" 501. (The previous comments in the LSP example above, pertaining to the generating of similar aggregate bandwidth databases for the other nodes of ring 500 are also applicable in this case.)

VPLS Example

Figure 5:
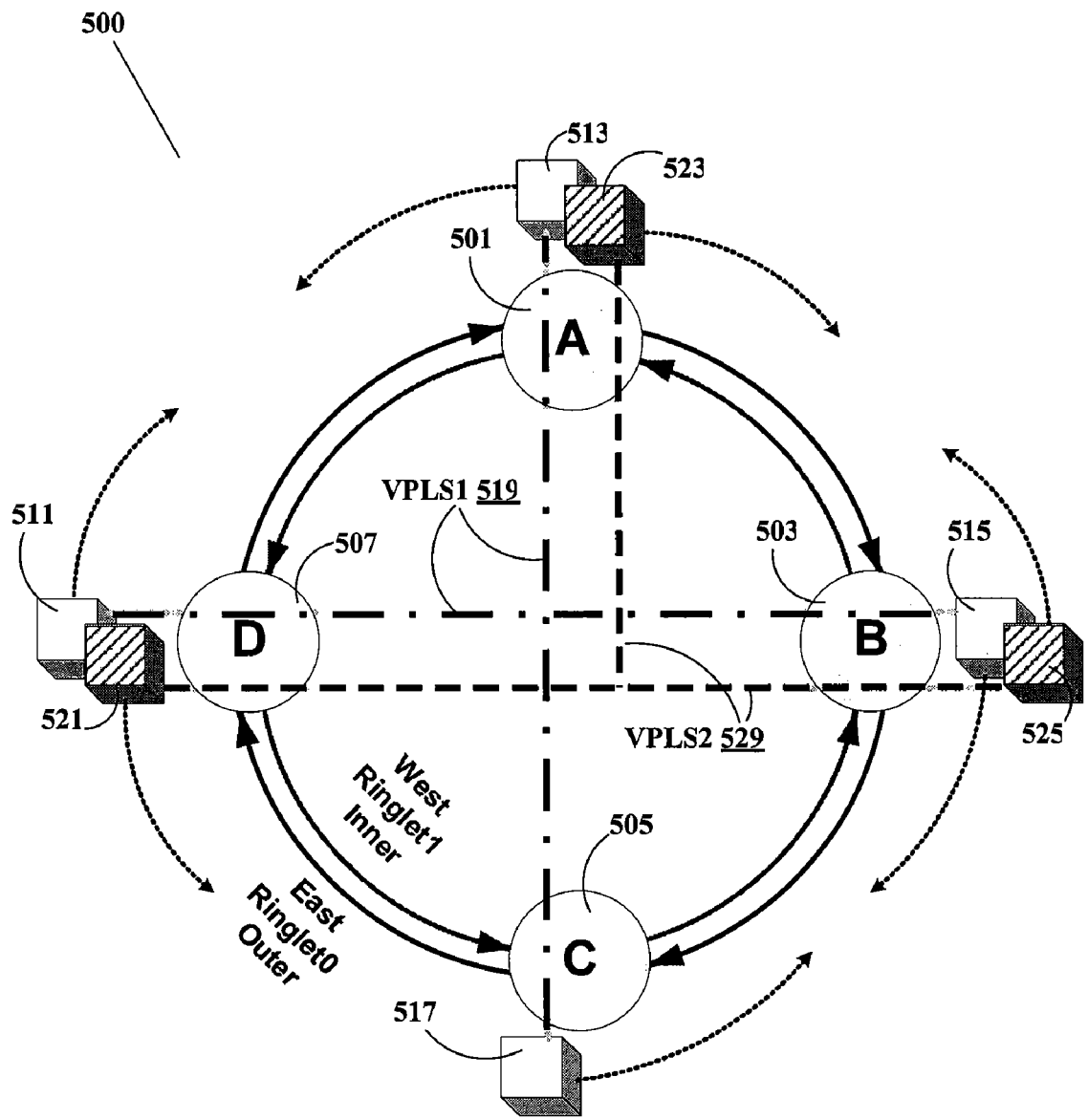
FIG. 5 is a simplified illustration conceptually showing a non-limiting example of bandwidth responsive functionality for a ring supporting Virtual Private LAN Services (VPLS's) according to an embodiment of the present invention.

A non-limiting example is illustrated in FIG. 5. A ring network 500 has a node "A" 501, a node "B" 503, a node "C" 505, and a node "D" 507.

A virtual private LAN service (VPLS), denoted as VPLS1 519 has a device 511 connected to node "D" 507, a device 513 connected to node "A" 501, a device 515 connected to node "B" 503, and a device 517 connected to node "C" 505. The virtual LAN connections 519 between the respective devices 511, 513, 515, and 517 are implemented physically by ring network 500.

Similarly, a VPLS denoted as VPLS2 529 has a device 521 connected to node "D" 507, a device 523 connected to node "A" 501, and a device 525 connected to node "B" 503. The virtual LAN connections 529 between the respective devices 521, 523, and 525 are also implemented physically by ring network 500.

For this non-limiting example, the bandwidth allocation database is shown in Table 14. Note that in all cases, the protection is steer revertive, and as previously discussed, only the VPLS source is taken into account; the VPLS destination is not considered when aggregating rates.

TABLE 14

Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 1 | D | Outer | 50 | 20 | 70 | 10 | 40 |
| 1 | A | Inner | 60 | 30 | 80 | 20 | 50 |
| 1 | B | Outer | 70 | 40 | 90 | 30 | 60 |
| 1 | C | Inner | 80 | 50 | 100 | 40 | 70 |
| 2 | D | Inner | 90 | 60 | 110 | 50 | 80 |
| 2 | A | Outer | 100 | 70 | 120 | 60 | 90 |
| 2 | B | Inner | 110 | 80 | 130 | 70 | 100 |

As done previously for the LSP example and as indicated in initialization step 205 of FIG. 2A, we begin by initializing the aggregate bandwidth database for node "A" 501. In contrast to the LSP example, however, both the outer and inner ringlets are of interest, as shown in Table 15.

TABLE 15

Initialized Aggregate Bandwidth Database for VPLS Example

| | | Assured Forwarding | | |
|---|---|---|---|---|
| | | Real Time | T1-CIR | T1-EIR |
| Outer | Normal | | | |
| | Fail AB | | | |
| | Fail BC | | | |
| | Fail CD | | | |
| | Fail DA | | | |
| Inner | Normal | | | |
| | Fail AB | | | |
| | Fail BC | | | |
| | Fail CD | | | |
| | Fail DA | | | |

Next, to iterate through the various fields of the Bandwidth Allocation Database (as indicated by loop entry point 207 of FIG. 2A), we start with the first VPLS1 entry from Table 14 as shown in Table 16:

TABLE 16

First iteration group in Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 1 | D | Outer | 50 | 20 | 70 | 10 | 40 |

After iterating on the applicable fields of Table 16 according to the predetermined rules for VPLS aggregation as presented above, the Aggregate Bandwidth Database is:

TABLE 17

Aggregate Bandwidth Database for VPLS Example - after 1st Iteration Group

| | | Assured Forwarding | | |
|---|---|---|---|---|
| | | Real Time | T1-CIR | T1-EIR |
| Outer | Normal | 50 | 20 | 70 |
| | Fail AB | 50 | 10 | 40 |
| | Fail BC | 50 | 10 | 40 |
| | Fail CD | 50 | 10 | 40 |
| | Fail DA | | | |
| Inner | Normal | | | |
| | Fail AB | | | |
| | Fail BC | | | |
| | Fail CD | | | |
| | Fail DA | 50 | 10 | 40 |

Proceeding to the second VPLS1 entry from Table 14, the iteration group is shown in Table 18:

TABLE 18

Second iteration group in Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 1 | A | Inner | 60 | 30 | 80 | 20 | 50 |

This second iteration results in:

TABLE 19

Aggregate Bandwidth Database for VPLS Example - after 2nd Iteration Group

| | | Assured Forwarding | | |
|---|---|---|---|---|
| | | Real Time | T1-CIR | T1-EIR |
| Outer | Normal | 50 | 20 | 70 |
| | Fail AB | 50 | 10 | 40 |
| | Fail BC | 50 | 10 | 40 |
| | Fail CD | 50 | 10 | 40 |
| | Fail DA | | | |
| Inner | Normal | | | |
| | Fail AB | | | |
| | Fail BC | | | |
| | Fail CD | | | |
| | Fail DA | 50 | 10 | 40 |

It is seen that Table 19 is identical to Table 17, because we are aggregating bandwidth requirements for node "A" 501, and the source in Table 18 is also node "A" 501. As previously presented in the general predetermined rules, the bandwidths for the source node are not added.

Proceeding to the third VPLS1 entry from Table 14, the iteration group is shown in Table 18:

TABLE 20

Third iteration group in Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 1 | B | Outer | 70 | 40 | 90 | 30 | 60 |

This third iteration results in:

TABLE 21

Aggregate Bandwidth Database for VPLS Example - after 3$^{rd}$ Iteration Group

| | | Assured Forwarding | | |
|---|---|---|---|---|
| | | Real Time | T1-CIR | T1-EIR |
| Outer | Normal | 50 + 70 = 120 | 20 + 40 = 60 | 70 + 90 = 160 |
| | Fail AB | 50 + 70 = 120 | 10 + 30 = 40 | 40 + 60 = 100 |
| | Fail BC | 50 | 10 | 40 |
| | Fail CD | 50 | 10 | 40 |
| | Fail DA | | | |
| Inner | Normal | | | |
| | Fail AB | | | |
| | Fail BC | 70 | 30 | 60 |
| | Fail CD | 70 | 30 | 60 |
| | Fail DA | 50 + 70 = 120 | 10 + 30 = 40 | 40 + 60 = 100 |

Proceeding to the fourth and last VPLS1 entry from Table 14, the iteration group is shown in Table 22:

TABLE 22

Fourth iteration group in Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 1 | C | Inner | 80 | 50 | 100 | 40 | 70 |

This fourth iteration results in:

TABLE 23

Aggregate Bandwidth Database for VPLS Example - after 4$^{th}$ Iteration Group

| | | Assured Forwarding | | |
|---|---|---|---|---|
| | | Real Time | T1-CIR | T1-EIR |
| Outer | Normal | 120 | 60 | 160 |
| | Fail AB | 120 + 80 = 200 | 40 + 40 = 80 | 100 + 70 = 170 |
| | Fail BC | 50 + 80 = 130 | 10 + 40 = 50 | 40 + 70 = 110 |
| | Fail CD | 50 | 10 | 40 |
| | Fail DA | | | |
| Inner | Normal | 80 | 50 | 100 |
| | Fail AB | | | |
| | Fail BC | 70 | 30 | 60 |
| | Fail CD | 70 + 80 = 150 | 30 + 40 = 70 | 60 + 70 = 130 |
| | Fail DA | 120 + 80 = 200 | 40 + 40 = 80 | 100 + 70 = 170 |

At this point, there are three more iterations to perform, for the bandwidth allocations of VPLS2.

Proceeding to the first VPLS2 entry from Table 14, the iteration group is shown in Table 24:

TABLE 24

Fifth iteration group in Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 2 | D | Inner | 90 | 60 | 110 | 50 | 80 |

This fifth iteration results in:

TABLE 25

Aggregate Bandwidth Database for VPLS Example - after 5$^{th}$ Iteration Group

| | | Assured Forwarding | | |
|---|---|---|---|---|
| | | Real Time | T1-CIR | T1-EIR |
| Outer | Normal | 120 | 60 | 160 |
| | Fail AB | 200 + 90 = 290 | 80 + 50 = 130 | 170 + 80 = 250 |
| | Fail BC | 130 + 90 = 220 | 50 + 50 = 100 | 110 + 80 = 190 |
| | Fail CD | 50 + 90 = 140 | 10 + 50 = 60 | 40 + 80 = 120 |
| | Fail DA | | | |
| Inner | Normal | 80 + 90 = 170 | 50 + 60 = 110 | 100 + 110 = 210 |
| | Fail AB | | | |
| | Fail BC | 70 | 30 | 60 |
| | Fail CD | 150 | 70 | 130 |
| | Fail DA | 200 + 90 = 290 | 80 + 50 = 130 | 170 + 80 = 250 |

Proceeding to the second VPLS2 entry from Table 14, the iteration group is shown in Table 26:

TABLE 26

Sixth iteration group in Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 2 | A | Outer | 100 | 70 | 120 | 60 | 90 |

This sixth iteration results in:

TABLE 27

Aggregate Bandwidth Database for VPLS Example - after 6$^{th}$ Iteration Group

| | | Assured Forwarding | | |
|---|---|---|---|---|
| | | Real Time | T1-CIR | T1-EIR |
| Outer | Normal | 120 | 60 | 160 |
| | Fail AB | 290 | 130 | 250 |
| | Fail BC | 220 | 100 | 190 |
| | Fail CD | 140 | 60 | 120 |

TABLE 27-continued

Aggregate Bandwidth Database for VPLS Example - after 6$^{th}$ Iteration Group

|  |  | Assured Forwarding | | |
|---|---|---|---|---|
|  |  | Real Time | T1-CIR | T1-EIR |
| Inner | Fail DA |  |  |  |
|  | Normal | 170 | 110 | 210 |
|  | Fail AB |  |  |  |
|  | Fail BC | 70 | 30 | 60 |
|  | Fail CD | 150 | 70 | 130 |
|  | Fail DA | 290 | 130 | 250 |

It is seen that Table 27 is identical to Table 25, because we are aggregating bandwidth requirements for node "A" 501, and the source in Table 26 is also node "A" 501. As previously presented in the general predetermined rules, the bandwidths for the source node are not added.

Finally, proceeding to the third VPLS2 entry from Table 14, the iteration group is shown in Table 28:

TABLE 28

Seventh iteration group in Bandwidth Allocation Database for VPLS Example

| VPLS ID | VPLS Source | Configured Ringlet | RT Rate | T1 CIR | T1 EIR | T1 CIR Prot | T1 EIR Prot |
|---|---|---|---|---|---|---|---|
| 2 | B | Inner | 110 | 80 | 130 | 70 | 100 |

This seventh and final iteration results in:

TABLE 29

Aggregate Bandwidth Database for VPLS Example - after 7$^{th}$ Iteration Group

|  |  | Assured Forwarding | | |
|---|---|---|---|---|
|  |  | Real Time | T1-CIR | T1-EIR |
| Outer | Normal | 120 | 60 | 160 |
|  | Fail AB | 290 + 110 = 400 | 130 + 70 = 200 | 250 + 100 = 350 |
|  | Fail BC | 220 | 100 | 190 |
|  | Fail CD | 140 | 60 | 120 |
|  | Fail DA |  |  |  |
| Inner | Normal | 170 + 110 = 280 | 110 + 80 = 190 | 210 + 130 = 340 |
|  | Fail AB |  |  |  |
|  | Fail BC | 70 + 110 = 180 | 30 + 70 = 100 | 60 + 100 = 160 |
|  | Fail CD | 150 + 110 = 260 | 70 + 70 = 140 | 130 + 130 = 230 |
|  | Fail DA | 290 + 110 = 400 | 130 + 70 = 200 | 250 + 100 = 350 |

Therefore, the aggregate bandwidth database for node "A" 501 as used for traffic management is:

TABLE 30

Deliverable Node "A" Aggregate Bandwidth Database for VPLS Example

|  |  | Assured Forwarding | | |
|---|---|---|---|---|
|  |  | Real Time | T1-CIR | T1-EIR |
| Outer | Normal | 120 | 60 | 160 |
|  | Fail AB | 400 | 200 | 350 |
|  | Fail BC | 220 | 100 | 190 |
|  | Fail CD | 140 | 60 | 120 |
|  | Fail DA |  |  |  |
| Inner | Normal | 280 | 190 | 340 |
|  | Fail AB |  |  |  |
|  | Fail BC | 180 | 100 | 160 |
|  | Fail CD | 260 | 140 | 230 |
|  | Fail DA | 400 | 200 | 350 |

Computer Program Product

A further embodiment of the present invention provides a computer program product for performing a method disclosed in the present application or any variant derived therefrom. A computer program product according to this embodiment includes a set of executable commands for a computer, and is incorporated within tangible and persistent machine-readable data storage including, but not limited to: computer media of any kind, such as magnetic media and optical media; computer memory; semiconductor memory storage; flash memory storage; data storage devices; and a computer or communications network. The terms "perform", "performing", etc., and "run", "running", when used with reference to a computer program product herein denote the action of a computer when executing the computer program product, as if the computer program product were performing the actions. The term "computer" herein denotes any data processing apparatus capable of, or configured for, executing a set of executable commands to perform a method, including, but not limited to: computers; workstations; servers; gateways; routers; switches; networks; processors; controllers; and other devices capable of processing data.

While the invention has been described with respect to a limited number of embodiments, it will be appreciated that many variations, modifications and other applications of the invention may be made.

The invention claimed is:
1. An Ethernet ring network comprising:
a plurality of nodes;
a plurality of segments;
a traffic management module responsive to:
 a priori bandwidth knowledge for automatically configuring a set of traffic management parameters of at least one of the plurality of nodes; and
 a priori bandwidth change knowledge for automatically reconfiguring said set of traffic management parameters of at least one of the plurality of nodes;

wherein said a priori bandwidth knowledge is based on available bandwidths of the plurality of nodes and segments; and said a priori bandwidth knowledge is independent of traffic rates within the Ethernet ring.

2. The Ethernet ring network of claim 1, wherein at least one of said a priori bandwidth knowledge and said a priori bandwidth change knowledge is associated with a traffic management module.

3. The Ethernet ring network of claim 2, wherein said traffic management module is associated with the Ethernet ring network.

4. The Ethernet ring network of claim 3, further comprising an aggregate bandwidth database for at least one node, said aggregate bandwidth database containing at least one field, said at least one field having at least one value corresponding to a predetermined set of keys containing at least one key selected from: a Class of Service; a Class Type; a ring side; and a protection scenario;

wherein said at least one value corresponding to said set of keys is determined according to a priori available bandwidth knowledge of at least one other part of the network;

and wherein said aggregate bandwidth database provides input for said a priori bandwidth knowledge and for said a priori bandwidth change knowledge.

5. The Ethernet ring network of claim 4, wherein said at least one other part includes at least one path.

6. A method for providing to a traffic management module an aggregate bandwidth database for an Ethernet ring network having a plurality of nodes, the method comprising:

obtaining, by a data processing apparatus, a bandwidth allocation database containing an allocated pass-through bandwidth corresponding to each node of the plurality of nodes;

providing, by the data processing apparatus, an aggregate bandwidth database containing at least one field, said field having at least one value initialized to zero and associated with a predetermined set of keys having at least one key selected from: a Class of Service; a Class Type; a ring side; and a protection scenario;

for a given node of the plurality of nodes, aggregating, by the data processing apparatus, to said at least one value said allocated pass-through bandwidth corresponding to said given node according to a predetermined rule; and providing, by the data processing apparatus, said aggregate bandwidth database to the traffic management module.

7. The method of claim 6, wherein said Class of Service is one of: High Priority; Expedited Forwarding; Assured Forwarding; Best Effort; and Expedited Forwarding multicast.

8. The method of claim 6, wherein said Class Type is one of: Real Time; T1 Committed Information Rate; T1 Excess Information Rate; T2 Committed Information Rate; and T2 Excess Information Rate.

9. The method of claim 6, wherein said allocated pass-through bandwidth is categorized by said Class Type.

10. The method of claim 6, wherein said ring side is one of: Outer side; and Inner side.

11. The method of claim 6, wherein the Ethernet ring further has at least one segment connecting at least two nodes of the plurality of nodes, and wherein said protection scenario is one of: a normal scenario; and a failure protection scenario for said segment.

12. The method of claim 6, wherein the Ethernet ring has shared nodes with an Ethernet multipoint service, and wherein for each of said shared nodes, said allocated pass-through bandwidth is a maximum for said Class Type.

13. The method of claim 12, wherein the Ethernet ring further has at least one segment connecting at least two nodes of the plurality of nodes, and wherein said protection scenario is one of: a normal scenario; and a failure protection scenario for said segment.

14. The method of claim 13, wherein said Ethernet multipoint service is an E-Line, and wherein said predetermined rule for said given node is that said aggregating is to be performed for said normal scenario only for transit through said given node when none of said at least one segment has failed.

15. The method of claim 14, wherein said E-Line has a steer-protected flow passing through said given node, and wherein said allocated pass-through bandwidth is an LSP protection bandwidth for said Class of Service and said Class Type.

16. The method of claim 13, wherein said E-Line has a non-protected flow, and wherein said predetermined rule for said given node is that said aggregating is to be performed when said key is a failure protection scenario only if said non-protected flow does not pass through said given node.

17. The method of claim 13, wherein said Ethernet multipoint service is an E-LAN.

18. The method of claim 17, wherein said E-LAN contains at least one network element, exactly one of which is a source network element, wherein said predetermined rule is that said allocated pass-through bandwidth to be aggregated is the aggregation of the corresponding allocated pass-through bandwidths of all of said at least one network element except said source network element.

19. A computer program product comprising machine-readable data storage and containing executable commands configured, when executed by a computer, to perform:

obtaining a bandwidth allocation database containing an allocated pass-through bandwidth corresponding to each node of a plurality of nodes of an Ethernet ring network;

providing an aggregate bandwidth database containing at least one field, said field having at least one value initialized to zero and associated with a predetermined set of keys having at least one key selected from: a Class of Service; a Class Type; a ring side; and a protection scenario;

for a given node of said plurality of nodes, aggregating to said at least one value said allocated pass-through bandwidth corresponding to said given node according to a predetermined rule; and providing said aggregate bandwidth database to a traffic management module.

* * * * *